US012756099B2

(12) United States Patent
Ho et al.

(10) Patent No.: US 12,756,099 B2
(45) Date of Patent: Oct. 6, 2026

(54) ANTENNA STRUCTURE AND ELECTRONIC DEVICE

(71) Applicant: WISTRON NEWEB CORPORATION, Hsinchu (TW)

(72) Inventors: Wen-Pin Ho, Hsinchu (TW); Shih-Kai Hsu, Hsinchu (TW); Ching-Wen Chen, Hsinchu (TW); Kai Shih, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 336 days.

(21) Appl. No.: 18/752,975

(22) Filed: Jun. 25, 2024

(65) Prior Publication Data

US 2025/0015499 A1 Jan. 9, 2025

Related U.S. Application Data

(60) Provisional application No. 63/512,094, filed on Jul. 6, 2023.

(30) Foreign Application Priority Data

Jun. 17, 2024 (TW) ................................ 113122260

(51) Int. Cl.
*H01Q 9/04* (2006.01)
*H01Q 1/22* (2006.01)

(52) U.S. Cl.
CPC ......... *H01Q 9/0414* (2013.01); *H01Q 1/2291* (2013.01); *H01Q 9/045* (2013.01)

(58) Field of Classification Search
CPC .... H01Q 9/0414; H01Q 1/2291; H01Q 9/045; H01Q 5/328; H01Q 1/2266; H01Q 9/42; H01Q 5/378; H01Q 5/371; H01Q 1/243
See application file for complete search history.

(56) References Cited

U.S. PATENT DOCUMENTS

2018/0159209 A1* 6/2018 Mikata .................... B32B 27/06
2020/0312798 A1* 10/2020 Kawahata ............. G01S 13/931

FOREIGN PATENT DOCUMENTS

| | | | |
|---|---|---|---|
| TW | 201624840 | A | 7/2016 |
| TW | I734468 | B | 7/2021 |
| TW | 202236739 | A | 9/2022 |
| TW | 202308223 | A | 2/2023 |

* cited by examiner

*Primary Examiner* — Renan Luque

(74) *Attorney, Agent, or Firm* — McClure, Qualey & Rodack, LLP

(57) ABSTRACT

An antenna structure and an electronic device are provided. The electronic device includes a housing and an antenna structure disposed in the housing. The antenna structure includes a carrier having a first carrying part and a second carrying part connected to each other, a switching circuit, a first radiating element, and a second radiating element. A thickness of the first carrying part is greater than a thickness of the second carrying part. The second carrying part includes a circuit layer and a ground layer respectively formed on opposite surfaces of the second carrying part. The switching circuit is located on the circuit layer. The first radiating element and the second radiating element are disposed on the carrier and respectively electrically connected to a feed element and the switching circuit. The second radiating element and the first radiating element are apart from and couple with each other.

19 Claims, 9 Drawing Sheets

ANTENNA STRUCTURE AND ELECTRONIC DEVICE

CROSS-REFERENCE TO RELATED PATENT APPLICATION

This application claims the benefit of priorities to Taiwan Patent Application No. 113122260, filed on Jun. 17, 2024 and the U.S. Provisional Application Ser. No. 63/512,094 filed on Jul. 6, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure and an electronic device, and more particularly to an antenna structure with increased bandwidth and an electronic device having such an antenna structure.

BACKGROUND OF THE DISCLOSURE

In the existing technology, the production of antenna structures generally uses High Density Interconnect (HDI) printed circuit boards as the substrate. The manufacturing process of HDI PCBs involves using a traditional double-sided board as the core board and continuously laminating layers on the core board to form HDI PCB. This type of circuit board, produced through a continuous lamination process, is also known as a Build-up Multilayer (BUM) board. However, antenna structures made from HDI PCBs have complex manufacturing processes, high production costs, and long production times. Additionally, the antennas produced are insufficient in bandwidth.

Therefore, how to overcome the above defects through the improvement of structural design has become one of the important issues to be solved in this field.

SUMMARY OF THE DISCLOSURE

In one aspect, the present disclosure provides an antenna structure, which includes a carrier, a switching circuit, a first radiating element and a second radiating element. The carrier includes a first carrying part and a second carrying part that are connected to each other. The thickness of the first carrying part is greater than the thickness of the second carrying part, and the second carrying part has a circuit layer and a ground layer. The circuit layer and the ground layer are formed on opposite surfaces of the second carrying part, respectively. The switching circuit is located on the circuit layer. The first radiating element is arranged on the carrier and is electrically connected to a feed element. The second radiating element is arranged on the carrier and is electrically connected to the switching circuit, and the second radiating element and the first radiating element are apart from each other and couple with each other.

In another aspect, the present disclosure provides an electronic device, which includes a housing and an antenna structure arranged in the housing. The antenna structure includes a carrier, a switching circuit, a first radiating element and a second radiating element. The carrier includes a first carrying part and a second carrying part that are connected to each other. The thickness of the first carrying part is greater than the thickness of the second carrying part, and the second carrying part has a circuit layer and a ground layer. The circuit layer and the ground layer are formed on opposite surfaces of the second carrying part, respectively. The switching circuit is located on the circuit layer. The first radiating element is arranged on the carrier and is electrically connected to a feed element. The second radiating element is arranged on the carrier and is electrically connected to the switching circuit, and the second radiating element and the first radiating element are apart from each other and couple with each other.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
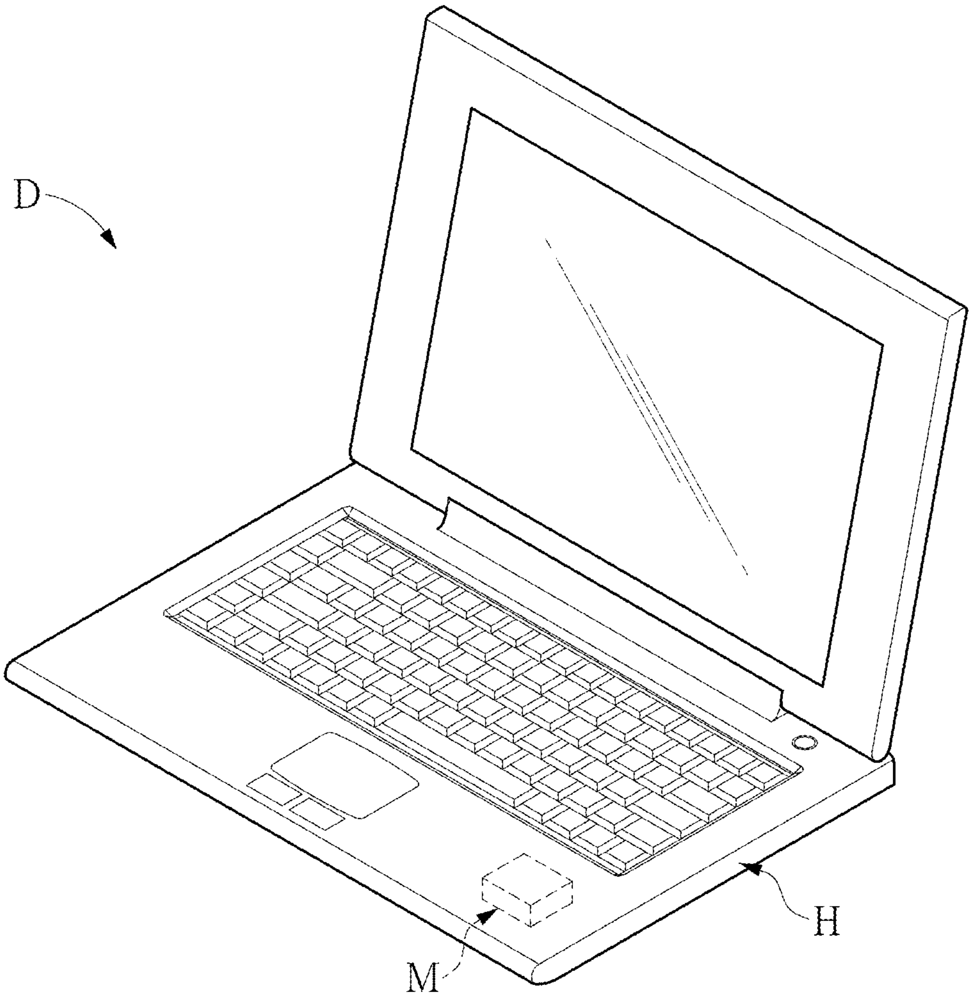
FIG. 1 is a perspective view of an electronic device of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In addition, the term "or", as used herein, should include any one or a combination of the associated enlisted items, as the case may be. The term "connect" in the context of the present disclosure means there is a physical connection between two elements and is directly or indirectly connected. The term "couple" in the context of the present disclosure means there is no physical connection between two separated elements, and the two elements are instead connected by their electric field energy where the electric field energy generated by the current of one element excites the electric field energy of the other element.

First Embodiment

FIG. 1 is a perspective view of an electronic device D of the present disclosure. Referring to FIG. 1, the electronic device D includes a housing H and an antenna structure M arranged in the housing H. The electronic device D may be a smart phone, tablet computer or laptop computer, and the present disclosure is not limited thereto. For illustration, the present disclosure will take a notebook computer as the electronic device D. In addition, the present disclosure does not limit the number and position of antenna structure M in the electronic device D.

Figure 2:
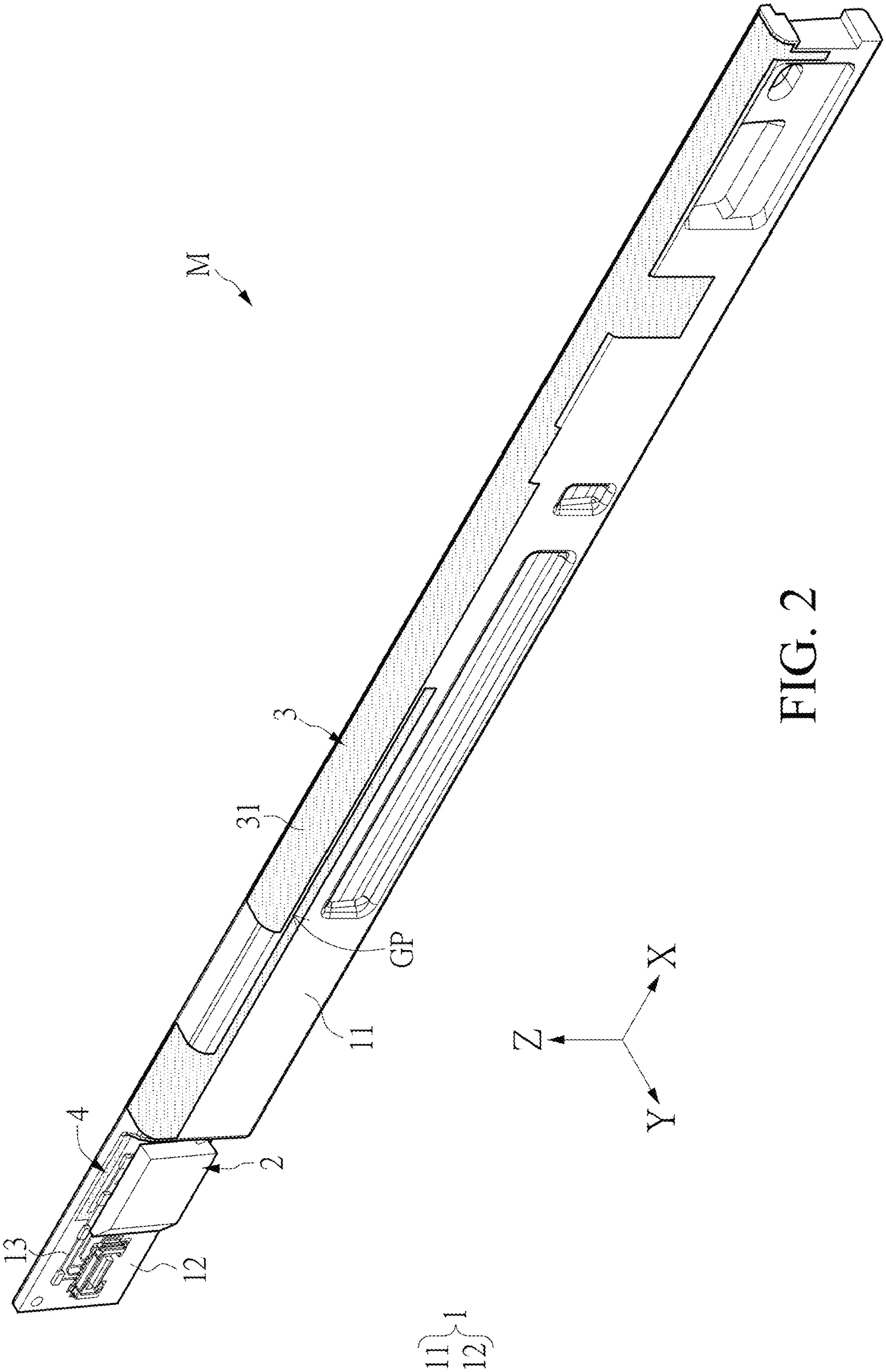
FIG. 2 is a first perspective view of an antenna structure according to a first embodiment of the present disclosure.
Figure 3:
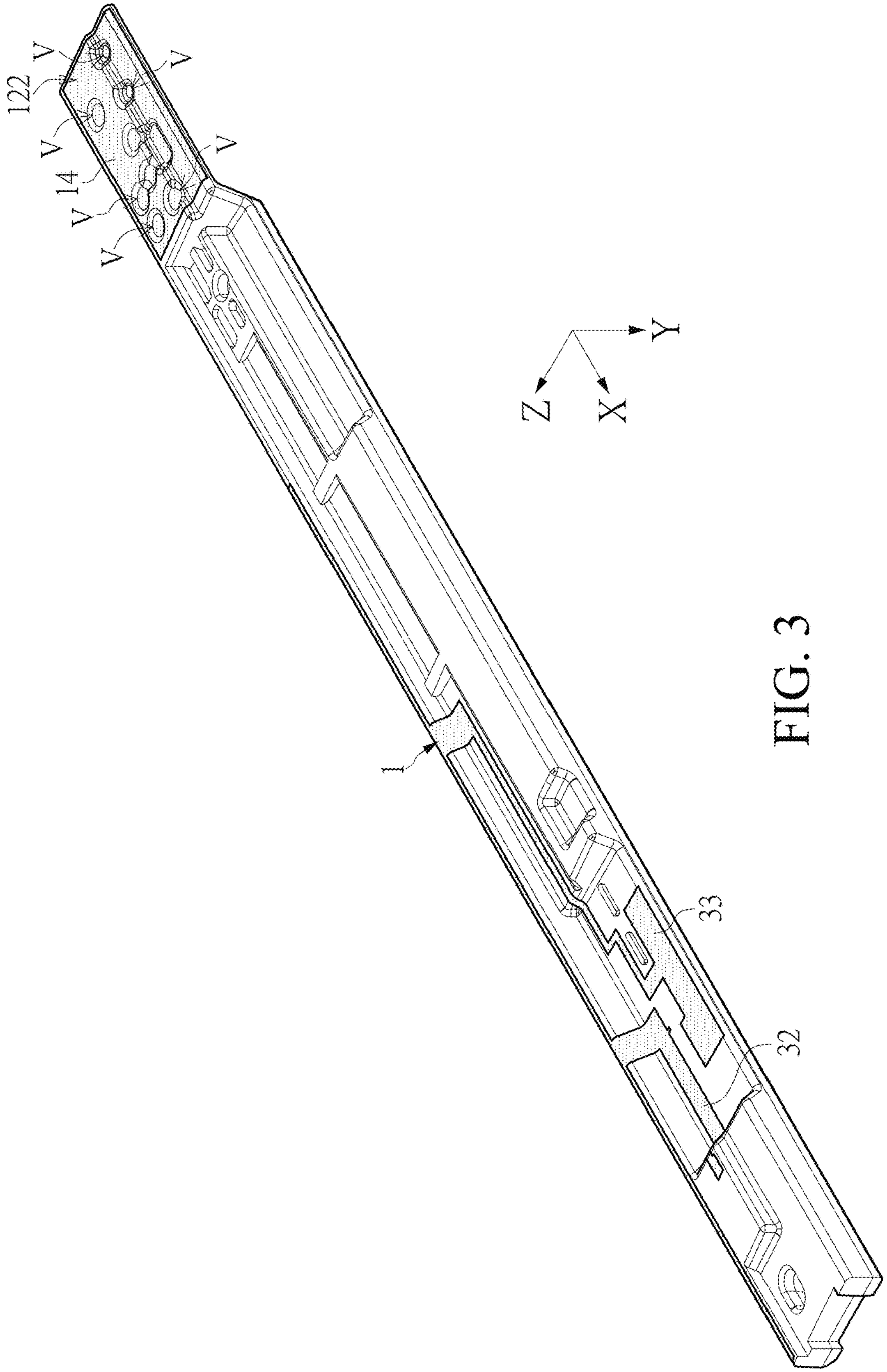
FIG. 3 is a second perspective view of the antenna structure according to the first embodiment of the present disclosure.
Figure 5:
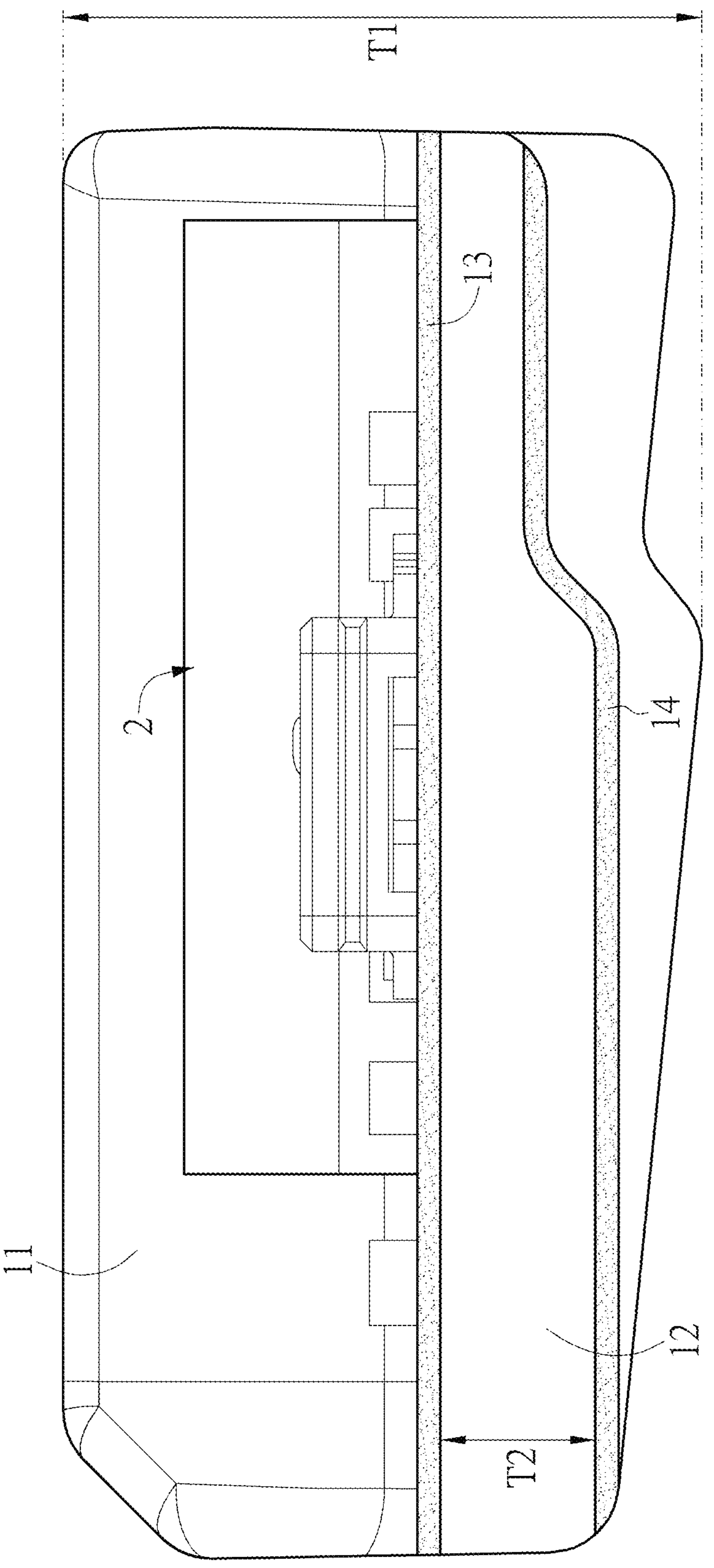
FIG. 5 is a side view of the antenna structure of the present disclosure.

FIG. 2 is a first perspective view of the antenna structure M according to a first embodiment of the present disclosure, FIG. 3 is a second perspective view of the antenna structure M according to the first embodiment of the present disclosure, and FIG. 5 is a side view of the antenna structure M of the present disclosure. Referring to FIG. 2, FIG. 3 and FIG. 5, the antenna structure M includes a carrier 1, a switching circuit 2, a first radiating element 3 and a second radiating element 4. The switching circuit 2, the first radiating element 3 and the second radiating element 4 are arranged on the carrier 1. In the present disclosure, the carrier 1 is not a substrate of a single thickness. The carrier 1 has a first carrying part 11 and a second carrying part 12 connected to the first carrying part 11, and the thickness T1 of the first carrying part 11 is greater than the thickness T2 of the second carrying part 12. Preferably, the thickness T2 of the second carrying part is between 0.6 mm and 1.6 mm.

Figure 4:
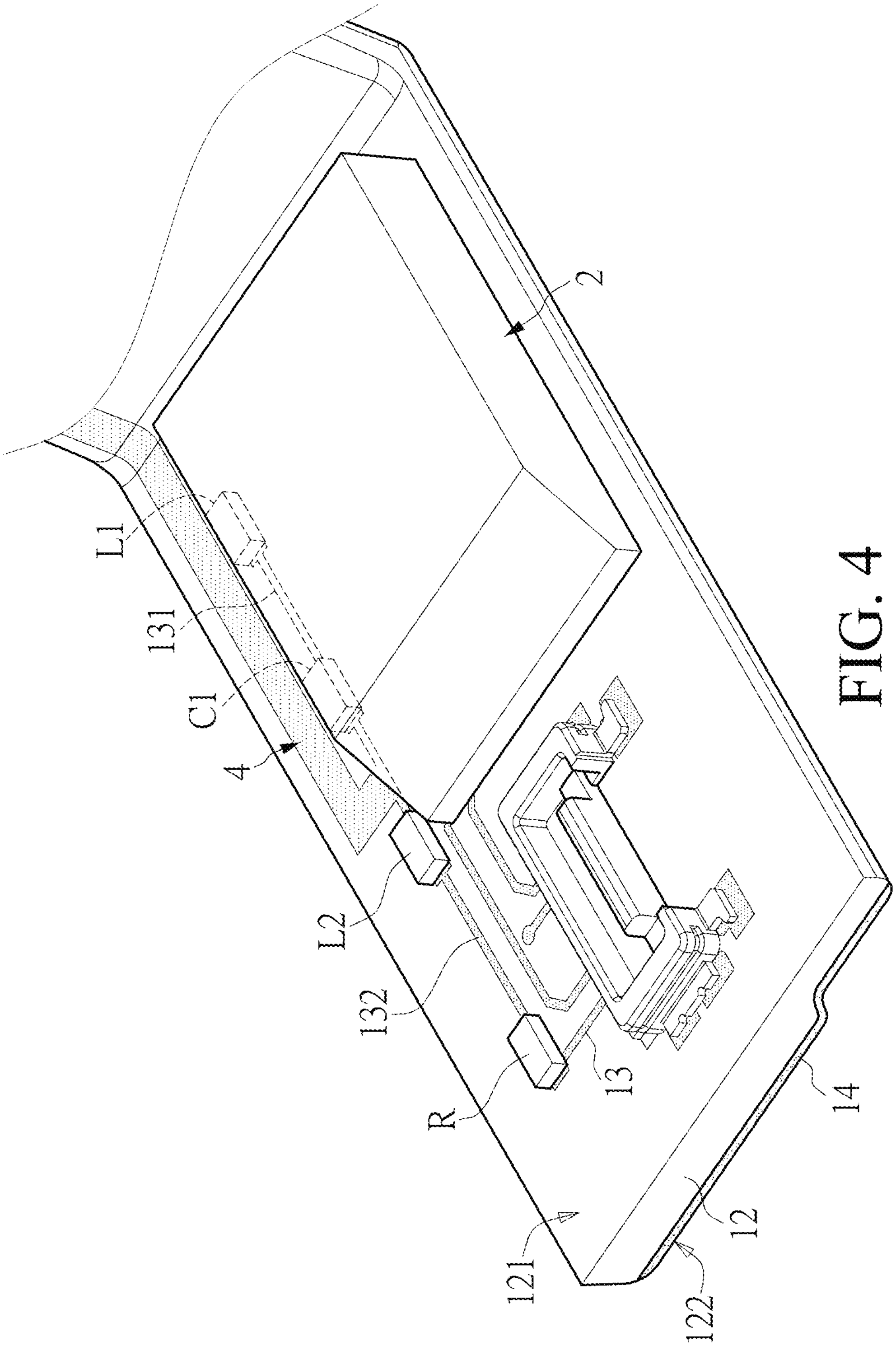
FIG. 4 is a partially enlarged schematic view of FIG. 3.
Figure 6:
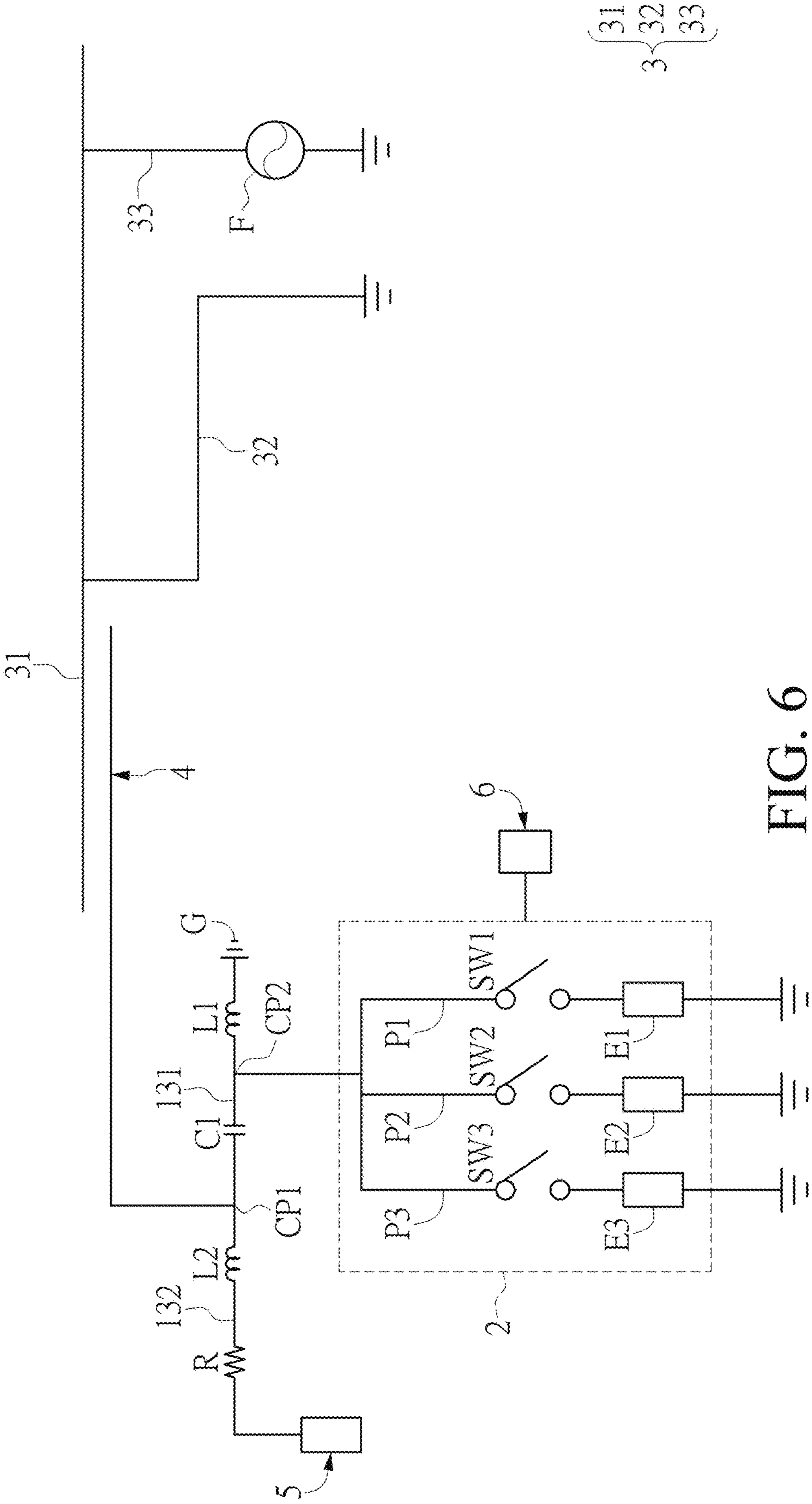
FIG. 6 is a schematic view of the antenna structure according to the first embodiment of the present disclosure.

FIG. 4 is a partially enlarged schematic view of FIG. 3. Referring to FIG. 4 and FIG. 5, the second carrying part 12 has a first surface 121 and a second surface 122 located on opposite sides. The first surface 121 is provided with a circuit layer 13, and the second surface 122 is provided with a ground layer 14. The second carrying part 12 is also provided with a plurality of conductive through holes V, and the circuit layer 13 and the ground layer 14 are electrically connected through the plurality of conductive through holes V. The number of conductive through holes V is at least two, and the present disclosure is not limited to the specific number of conductive through holes V. Preferably, the minimum distance between two adjacent conductive through holes is greater than or equal to 1.7 mm. The switching circuit 2 is arranged on the first surface 121 and is located on the circuit layer 13, and further, the switching circuit 2 is composed of a part of the circuit layer 13 and a plurality of circuit components located thereon. For example, the switching circuit 2 could be a tuner IC, preferably with at least four pins (not shown) for electrically connecting to the circuit layer 13. In addition, the present disclosure is not limited to a specific type of the first radiating element 3, for example, the first radiating element 3 can be a monopole antenna or a planar inverted-F antenna. The first radiating element 3 is electrically connected to a feed element F (as shown in FIG. 6), and the feed element F is configured for feeding RF signals. The second radiating element 4 is electrically connected to the switching circuit 2. There is a coupling gap GP of 0.2 mm to 0.4 mm between the second radiating element 4 and the first radiating element 3, so that the second radiating element 4 and the first radiating element 3 are apart from each other and couple to each other to generate at least one operating frequency.

It is to be noted that, compared with the conventional antenna carrier, being a multilayer circuit board (for example, HDI PCB), the carrier 1 of the present disclosure is a single-layer board structure, and the circuit layer 13, the ground layer 14, the first radiating element 3 and the second radiating element 4 are formed on the carrier 1 by laser direct structuring (LDS) process. Laser direct structuring uses a laser beam to carve out traces on a plastic surface, followed by electroplating after laser. After the surface of the traces is metallized, a conductive circuit is formed. The specific manufacturing steps of the antenna structure M are as follows: step 1: first, the carrier 1 is formed by injection molding technology; Step 2: the circuit layer 13, the ground layer 14, the first radiating element 3 and the second radiating element 4 are formed on the surface of the carrier 1 in by LDS; Step 3: the circuit components are soldered to the circuit layer 13 by reflow process through surface mount technology (SMT); Step 4: the antenna structure M is packaged and thus formed.

The present disclosure adopts a single-layer board to be the carrier 1 of the antenna, and forms the antenna structure M by LDS technology, which in turn further simplifies the overall production process compared with conventional production method and reduces the production cost. In addition, since the carrier 1 is a single-layer board structure, the thickness of the carrier 1 can be controlled to form a substrate with non-uniform thickness. Therefore, in the present disclosure, the conductive through holes can be formed at the thinner area of the carrier 1, namely the second carrying part 12 (the thickness is thinner, and it is easier to form through holes), and the switching circuit 2 is arranged on the second carrying part 12.

In addition, because the conventional antenna substrate is mostly a multilayer circuit board structure, and the interval between the ground layer and the circuit layer of the multilayer circuit board structure is quite close, the capacitance between the two layers is high. In contrast, the present disclosure further reduces the capacitance by controlling the thickness T2 of the second carrying part 12 in the range of 0.6 mm to 1.6 mm to increase the distance between the ground layer 14 and the circuit layer 13. Hence, the frequency offset amplitude of the operating frequency generated by the antenna structure M is increased, so that the operating frequency reaches a low frequency range that is as low as 500 MHz, and simultaneously the bandwidth is simultaneously increased.

FIG. 6 is a schematic view of the antenna structure M according to the first embodiment of the present disclosure. Referring to FIG. 6, the first radiating element 3 is a planar inverted-F antenna (PIFA). The first radiation part 3 includes a first radiating portion 31, a ground portion 32 and a feed portion 33. The ground portion 32 is configured for grounding, and the feed portion 33 is electrically connected to the feed element F. The first radiating portion 31 and the second radiating element 4 are apart from each other and couple with each other. Further, the second radiating element 4 is electrically connected to the switching circuit 2, and the switching circuit 2 includes a plurality of conduction paths, each of which has a switch and a passive component. Therefore, the switching circuit 2 is switched to different operating modes according to the switching state of different switches, so as to adjust the bandwidth of the operating frequency band generated by the coupling of the first radiating element 3 and the second radiating element 4.

For example, the switching circuit 2 has a first conduction path P1, a second conduction path P2, and a third conduction path P3. The first switch SW1 and the first passive component E1 are connected in series on the first conduction path P1, the second switch SW2 and the second passive component E2 are connected in series on the second conduction path P2, and the third switch SW3 and the third passive component E3 are connected in series on the third conduction path P3. The first passive component E1, the second passive component E2 and the third passive component E3 can be respectively resistor, capacitor or inductor, but the present disclosure is not limited thereto. The electronic device D can adjust the operating frequency band, impedance matching and/or radiation efficiency of the antenna structure M by using the configuration of the first passive component E1, the second passive component E2 and the third passive component E3.

As shown in FIG. 6, the switching circuit 2 has three modes of operation, namely the first mode, the second mode and the third mode. The electronic device D may further include a control circuit 6. The control circuit 6 can control the switching circuit 2 to switch to one of the multiple modes to adjust the operating frequency band of the antenna structure M. Specifically, the first mode is that the first switch SW1 located on the first conduction path P1 is in the conducting state, and the second and third switches SW2 and SW3 located on the second and third conduction paths P2 and P3 are in the non-conducting state; the second mode is that the second switch SW2 located on the second conduction path P2 is in the conducting state, and the first and third switches SW1 and SW3 located on the first and third conduction paths P1 and P3 are in the non-conducting state; in the third mode, the third switch SW3 located on the third conduction path P3 is in the conducting state, and the first and second switches SW1 and SW2 located on the first and second conduction paths P1 and P2 are in the non-conducting state.

Figure 7:
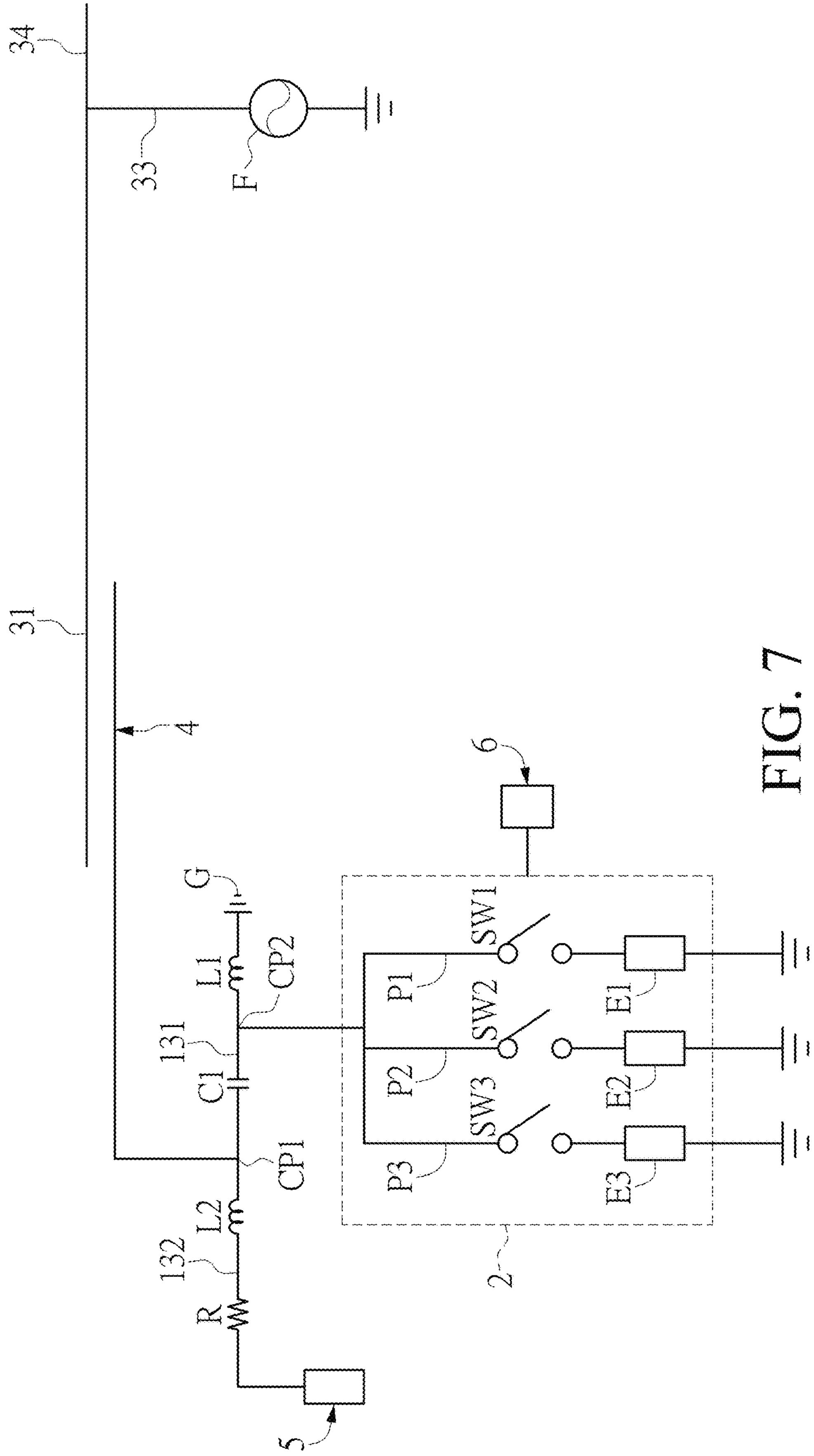
FIG. 7 is a schematic view of an antenna structure according to a second embodiment of the present disclosure.
Figure 8:
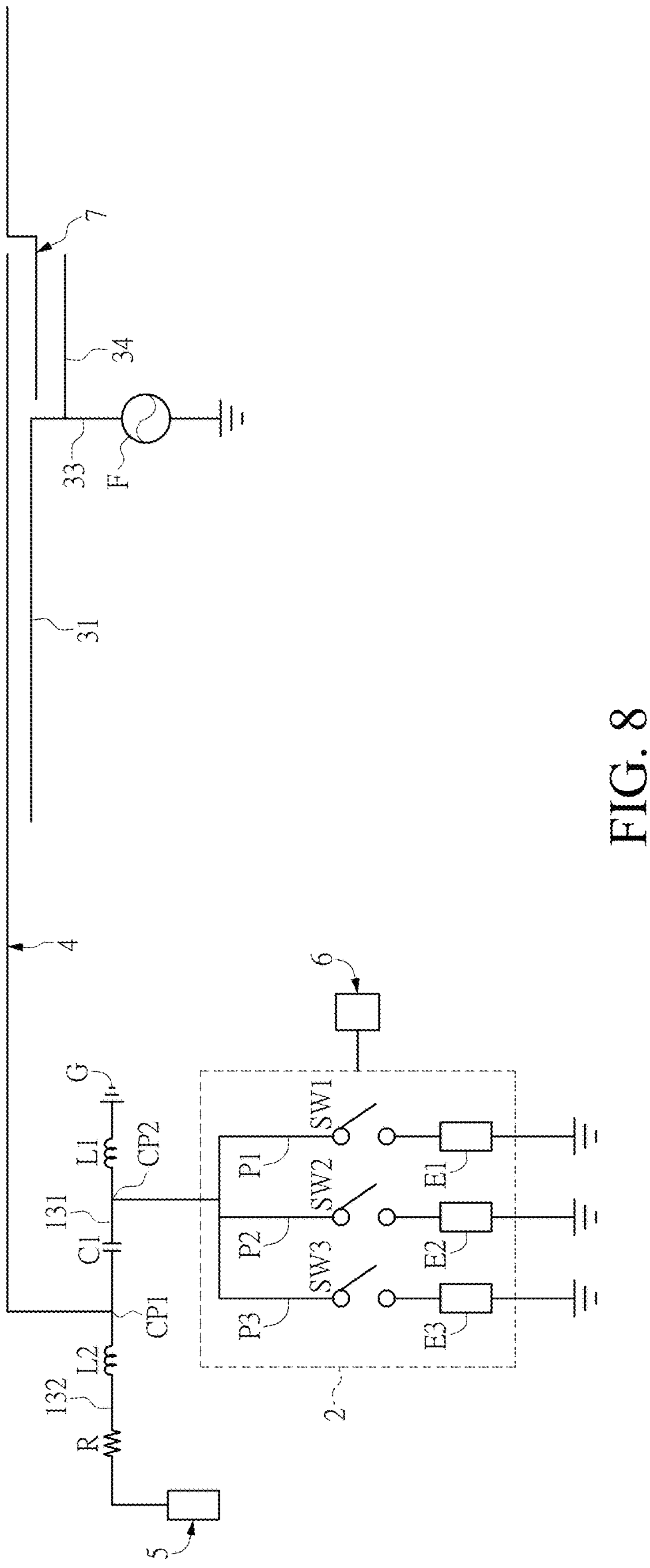
FIG. 8 is a schematic view of an antenna structure according to a third embodiment of the present disclosure.

FIG. 7 is a schematic view of an antenna structure according to a second embodiment of the present disclosure, and FIG. 8 is a schematic view of an antenna structure according to a third embodiment of the present disclosure. FIG. 7 and FIG. 8 reveal different embodiments of the first radiating element 3. Referring to FIG. 7, the first radiating element 3 is a monopole antenna, which includes a first radiating portion 31, a feed portion 33 and a second radiating portion 34. Referring to FIG. 8, the first radiating element 3 is a monopole antenna, and further, the antenna structure further includes a floating radiating element 7. One end of the floating radiating element 7 extends between the second radiating portion 34 and the second radiating element 4.

Figure 9:
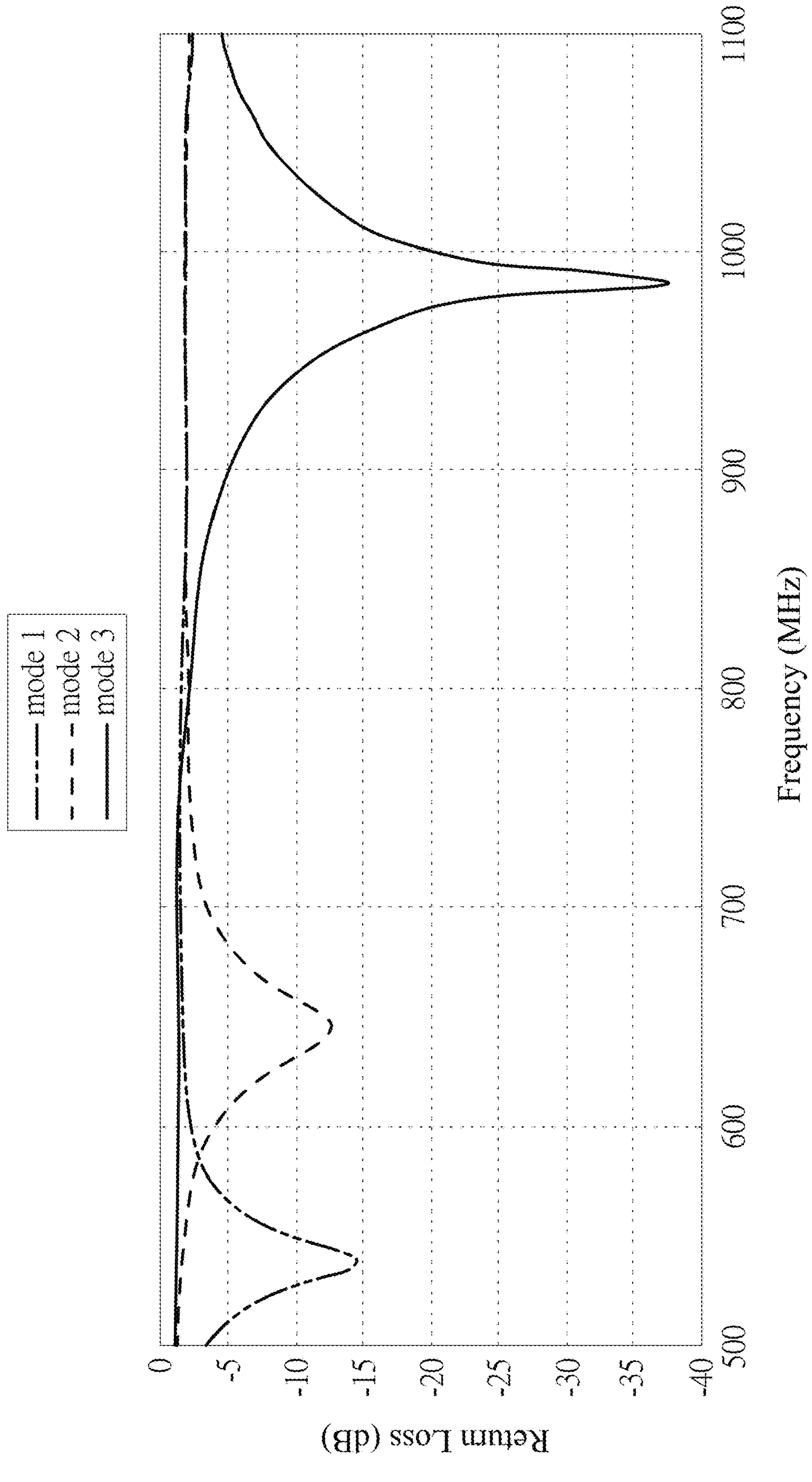
FIG. 9 is a graph illustrating the return loss of the antenna structure of the present disclosure under different operating modes.

FIG. 9 is a graph illustrating the return loss of the antenna structure of the present disclosure under different operating modes. Referring to FIG. 9, for example, when the switching circuit 2 is switched to the first mode (mode 1), the operating frequency band generated by the antenna structure M has a first center frequency. When the switching circuit 2 is switched to the second mode (mode 2), the operating frequency band generated by the antenna structure M has a second center frequency. When the switching circuit 2 is switched to the third mode (mode 3), the operating frequency band generated by the antenna structure M has a third center frequency. As shown in FIG. 9, with the structural configuration that the switching circuit 2 is located on the second carrying part 12, the present disclosure can adjust the center frequency of the operating frequency band by switching the switching circuit 2 to switch different transmission paths with different passive components respectively. As such, not only can the frequency width of the operating frequency band be increased, but also the frequency offset amplitude of the operating frequency band can be increased, so that the operating frequency band reaches a low frequency range that is as low as 500 MHz.

Referring to FIG. 4 and FIG. 6, the circuit layer 13 includes a first branch 131 and a second branch 132. The first branch 131 has a first capacitance component C1 and a first inductance component L1 connected in series with each other. One end of the first branch 131 is connected to the second radiating element 4 at a first contact CP1, and the other end of the first branch 131 is a grounding terminal G. The first branch 131 is connected to the switching circuit 2 at a second contact CP2, the first capacitance component C1 is connected in series between the first contact CP1 and the second contact CP2, and the first inductance component L1 is connected in series between the second contact CP2 and the grounding terminal G. The electronic device D may also include a proximity sensing circuit 5, and the proximity sensing circuit 5 is electrically connected to the second branch 132. The second branch 132 has a second inductance component L2 and a resistance component R connected in series with each other. One end of the second branch 132 is connected to the first contact CP1, and the other end of the second branch 132 is connected to the proximity sensing circuit 5.

The present disclosure regards the second radiating element 4 as a sensing electrode (Sensor pad) through the arrangement of the proximity sensing circuit 5, so that the proximity sensing circuit 5 measures the distance between an object (such as the user's leg or other parts) and the antenna structure M. In this way, the electronic device D can have the function of sensing whether the human body is close to the antenna structure M, and then the radiation power of the antenna structure M can be adjusted, so as to prevent the specific absorption rate (SAR) of electromagnetic wave energy per unit mass of the organism being too high. Further, when the second radiating element 4 is used as a sensing electrode with the proximity sensing circuit 5, the combination of the first capacitance component C1 and the first inductance component L1 can be used as an isolator to isolate the proximity sensing circuit 5 and the switching circuit 2, so as to prevent the proximity sensing circuit 5 and the switching circuit 2 from interfering with each other when they are in action. The combination of the second inductance component L2 and the resistance component R can be used as an RF choke to prevent RF signals from flowing into the proximity sensing circuit 5.

Beneficial Effects of the Embodiments

The antenna structure M and the electronic device D provided by the present disclosure can directly arrange the switching circuit 2, the first radiating element 3 and the second radiating element 4 on the carrier board 1 by LDS, so as to simplify the production process and reduce the production cost. In addition, the carrier 1 provided by the present disclosure is a single-layer board structure, which has different thickness throughout the board, so the circuit layer 13 and the ground layer 14 of the present disclosure can be formed on the second carrying part 12 which has a thinner thickness, so as to reduce the capacitance between the layers.

Furthermore, because the conventional antenna substrate is mostly a multilayer circuit board structure, and the interval between the ground layer and the circuit layer of the multilayer circuit board structure is quite close, the capacitance between the two layers is high. In contrast, the present disclosure further reduces the capacitance by controlling the thickness T2 of the second carrying part 12 in the range of 0.6 mm to 1.6 mm to increase the distance between the ground layer 14 and the circuit layer 13. Hence, with the structural configuration of the switching circuit 2 positioned on the second carrying part 12, the present disclosure can adjust the center frequency of the operating frequency band by switching the switching circuit 2 to match different transmission paths with different passive components respectively, not only can increase the bandwidth of the operating frequency band, but also can increase the frequency offset amplitude of the operating frequency band, so that the operating frequency band reaches an ultra-low frequency mode (as low as 500 MHz).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure comprising:
- a carrier comprising a first carrying part and a second carrying part connected to each other, wherein the second carrying part comprises a circuit layer and a ground layer respectively formed on opposite surfaces of the second carrying part, wherein a thickness of the first carrying part is greater than a thickness of the second carrying part;
- a switching circuit, located on the circuit layer;
- a first radiating element arranged on the carrier and electrically connected to a feed element; and
- a second radiating element arranged on the carrier and electrically connected to the switching circuit, and the second radiating element and the first radiating element are apart from and couple with each other.

2. The antenna structure according to claim 1, wherein the carrier is a single-layer board structure, and the circuit layer, the ground layer, the first radiating element and the second radiating element are formed on the carrier by laser direct structuring (LDS).

3. The antenna structure according to claim 1, wherein the thickness of the second carrying part is between 0.6 mm and 1.6 mm.

4. The antenna structure according to claim 1, wherein the second carrying part comprises a plurality of conductive through holes for electrically connecting to the circuit layer and the ground layer.

5. The antenna structure according to claim 4, wherein a minimum distance between two adjacent ones of the plurality of conductive through holes is greater than or equal to 1.7 mm.

6. The antenna structure according to claim 1, wherein the first radiating element is a planar inverted F antenna.

7. The antenna structure according to claim 1, wherein the switching circuit comprises a plurality of conduction paths, each of the plurality of conduction paths comprises a switch and a passive component, wherein the switching circuit is configured for switching to different operating modes according to switching states of the plurality of the switches, so as to adjust a bandwidth of an operating frequency band generated by a coupling between the first radiating element and the second radiating element.

8. The antenna structure according to claim 7, wherein the operating frequency band is in a low frequency range as low as 500 MHz.

9. The antenna structure according to claim 1, wherein the circuit layer comprises a first branch, the first branch comprises a first capacitance component and a first inductance component connected in series with each other, one end of the first branch is connected to the second radiating element at a first contact, another end of the first branch is a grounding terminal, the first branch is connected to the switching circuit at a second contact, the first capacitance component is connected in series between the first contact and the second contact, and the first inductance component is connected in series between the second contact and the grounding terminal.

10. The antenna structure according to claim 9, wherein the circuit layer further comprises a second branch, the second branch is electrically connected to a proximity sensing circuit, the second branch comprises a second inductance component and a resistance component connected in series with each other, one end of the second branch is connected to the first contact, and another end of the second branch is connected to the proximity sensing circuit.

11. An electronic device comprising:
- a housing; and
- an antenna structure disposed in the housing, and the antenna structure comprising:
  - a carrier comprising a first carrying part and a second carrying part connected to each other, wherein a thickness of the first carrying part is greater than a thickness of the second carrying part, and the second carrying part comprises a circuit layer and a ground layer respectively formed on opposite surfaces of the second carrying part;
- a switching circuit, located on the circuit layer;
  - a first radiating element arranged on the carrier and electrically connected to a feed element; and
  - a second radiating element arranged on the carrier and electrically connected to the switching circuit, and the second radiating element and the first radiating element are apart from and couple with each other.

12. The electronic device according to claim 11, wherein the carrier is a single-layer board structure, and the circuit layer, the ground layer, the first radiating element and the second radiating element are formed on the carrier by laser direct structuring.

13. The electronic device according to claim 11, wherein the thickness of the second carrying part is between 0.6 mm and 1.6 mm.

14. The electronic device according to claim 11, wherein the second carrying part comprises a plurality of conductive through holes for electrically connecting to the circuit layer and the ground layer.

15. The electronic device according to claim 11, wherein the first radiating element is a planar inverted-F antenna.

16. The electronic device according to claim 11, wherein the switching circuit comprises a plurality of conduction paths, each of the plurality of conduction paths comprises a switch and a passive component, wherein the switching circuit is configured for switching to different operating modes according to switching states of the plurality of the switches, so as to adjust the bandwidth of the operating frequency band generated by a coupling between the first radiating element and the second radiating element.

17. The electronic devices according to claim 16, wherein the operating frequency band is in a low frequency range as low as 500 MHZ.

18. The electronic device according to claim 11, wherein the circuit layer comprises a first branch, the first branch comprises a first capacitance component and a first inductance component connected in series with each other, one end of the first branch is connected to the second radiating part at a first contact, another end of the first branch is a grounding terminal, the first branch is connected to the switching circuit at a second contact, the first capacitance component is connected in series between the first contact and the second contact, and the first inductance component is connected in series between the second contact and the grounding terminal.

19. The electronic device according to claim 18, further comprising a proximity sensing circuit, wherein the circuit layer further comprises a second branch, the proximity sensing circuit is electrically connected to the second branch, the second branch comprises a second inductance component and a resistance component connected in series with each other, one end of the second branch is connected to the first contact, and another end of the second branch is connected to the proximity sensing circuit.

* * * * *